United States Patent Office 2,768,878
Patented Oct. 30, 1956

2,768,878

MANUFACTURE OF HYDRAZINE

Herbert J. Passino, Englewood, N. J., assignor to The M. W. Kellogg Company, Jersey City, N. J., a corporation of Delaware No Drawing. Application October 25, 1951,
Serial No. 253,197

15 Claims. (Cl. 23—190)

This invention relates to the manufacture of hydrazine. In one aspect, the invention relates to a process for the manufacture of hydrazine from a nitroso derivative of hexamethylenetetramine. More particularly in this aspect, the invention relates to a process for the manufacture of hydrazine from dinitrosopentamethylenetetramine. One of the objects of the invention is to provide an efficient process for the manufacture of hydrazine. Another object of the invention is to provide an efficient process for the manufacture of hydrazine from readily available materials. Other objects and advantages, inherent in the invention, will become apparent from the following description.

According to this invention, the manufacture of hydrazine is accomplished, generally, by first nitrosating hexamethylenetetramine to form the nitroso derivative or dinitrosopentamethylenetetramine. This latter compound is then subjected to hydrogenation, under the conditions as more fully hereinafter disclosed, to produce hydrazine as a product of the process. The term "hydrazine" is employed herein for the sake of convenience, but is intended to include not only hydrazine itself ($N_2H_4$), but also hydrazine hydrate ($N_2H_4.H_2O$).

The formation of hexamethylenetetramine, by the reaction of formaldehyde and ammonia, from which the dinitrosopentamethylenetetramine starting material of the present process is produced, is well known in the art and is therefore believed to require no further elaboration. This reaction may be represented as follows:

I

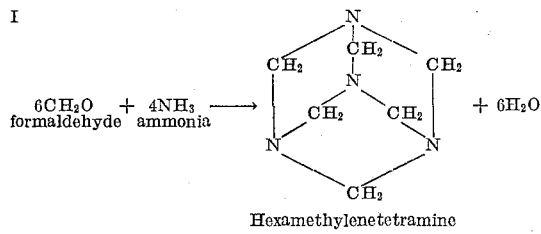

$$6CH_2O + 4NH_3 \longrightarrow \text{Hexamethylenetetramine} + 6H_2O$$

As indicated above, hexamethylenetetramine, thus produced is next nitrosated to produce the nitroso derivative or dinitrosopentamethylenetetramine. This nitrosation reaction may be represented as follows:

II

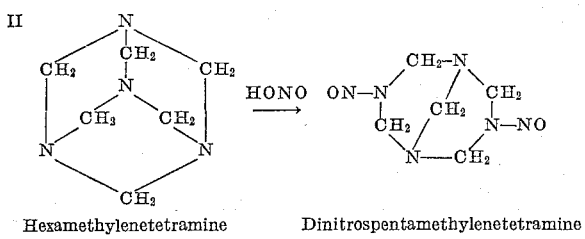

Hexamethylenetetramine    Dinitrospentamethylenetetramine

Dinitrosopentamethylenetetramine is a yellow crystalline solid and, as reported in Beilstein, vol. 1, p. 590, System No. 75, melts with complete decomposition at 207° C. In accordance with the process of the present invention, this latter compound is next subjected to hydrogenation to produce hydrazine as a product of the process. This hydrogenation or reduction reaction to produce hydrazine may be represented as follows:

III

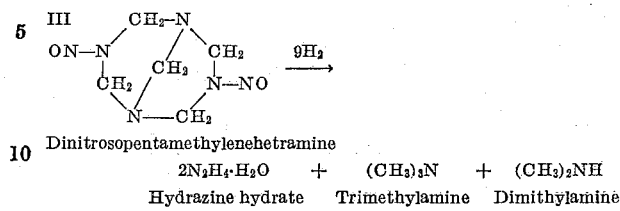

Dinitrosopentamethylenehetramine $$2N_2H_4 \cdot H_2O \quad + \quad (CH_3)_3N \quad + \quad (CH_3)_2NH$$

Hydrazine hydrate    Trimethylamine    Dimithylamine

From Equation III, above, it will be noted that the product of reaction includes not only hydrazine itself (in the form of its hydrate) but also other products of reaction which it is believed comprise a mixture of amines, namely, trimethylamine and dimethylamine, as shown in one possible representation of this reaction in Equation III. While hydrazine was found to be produced in appreciable quantity by the above reaction, as hereinafter disclosed, the identification of the other products of the reaction (i. e. trimethylamine and dimethylamine) is based on theoretical probability, but is not believed to be of importance to the present process insofar as the production of a hydrazine itself is concerned.

The aforementioned hydrogenation of dinitrosopentamethylenetetramine to form a product comprising hydrazine is carried out in a suitable reactor or reaction vessel, with or without a hydrogenation catalyst (as more fully hereinafter described), at a temperature between about 10° C. and about 200° C. Temperatures between about 25° C. and about 100° C. are preferred. The pressure employed is between about 15 pounds per square inch and about 1000 pounds per square inch, with pressures between about 100 pounds per square inch and about 500 pounds per square inch being preferred. If hydrogenation is conducted in the presence of a catalyst, such catalyst may comprise nickel (preferably Raney nickel), platinum, palladium, iron, cobalt, aluminum, or mixtures of such catalysts, either supported or unsupported. The hydrogenation treatment when employing solid catalysts is preferably carried out with the catalyst being in a fixed-bed state, although catalysts in a fluid-bed state may also be employed.

As previously indicated, the hydrogenation or reduction treatment of dinitrosopentamethylenetetramine may be carried out under the conditions indicated above with or without the presence of a hydrogenation catalyst. When this hydrogenation or reduction treatment is carried out with hydrogen being supplied to the reaction in a nascent state, the presence of a hydrogenation catalyst is unnecessary for carrying out the reaction. For this purpose, nascent hydrogen may be supplied to the reaction by employing such hydrogen-producing mixtures as zinc or tin and hydrochloric acid; stannous chloride in hydrochloric acid; or zinc in acetic acid. When the hydrogenation or reduction treatment of dinitrosopentamethylenetetramine is carried out with hydrogen being supplied to the reaction in the molecular state, the presence of a hydrogenation catalyst is required.

In carrying out the aforementioned hydrogenation treatment of dinitrosopentamethylenetetramine, with or without the presence of a hydrogenation catalyst, to form a product comprising hydrazine, it is preferred that this treatment be conducted with the dinitrosopentamethylenetetramine being present or suspended in an inert liquid medium in which this compound is at least partially soluble. If the hydrogenation treatment is carried out in the presence of a catalyst, the dinitrosopentamethylenetetramine and the catalyst are suspended in this inert liquid medium and the resulting mixture is subjected to hydrogenation. When the hydrogenation treatment is carried out without the presence of a catalyst, the dinitrosopentamethylenetetramine is mixed with one of the hydrogen-producing reactants (e. g. zinc) and with the inert liquid medium (e. g. water) to form a paste and this paste is then added to the other hydrogen-producing reactants (e. g. acetic acid) to supply hydrogen to the reaction. Suitable inert liquid media which may be employed for this purpose, comprise methyl alcohol, ethyl alcohol, hexane, heptane, diethyl ether, acetone, ammonium hydroxide and aqueous solutions that may be formed from these compounds.

Following the above hydrogenation or reduction of the dinitrosopentamethylenetetramine compound, there is obtained a product comprising hydrazine and other products of reaction in solution. As previously indicated, these other products of reaction may comprise a mixture of amines, such as trimethylamine and dimethylamine. In order to separate hydrazine from the thus-produced reaction product, this solution is preferably diluted with water and the resulting mixture distilled. The distillation is conducted at temperatures effective to obtain an overhead comprising the relatively lower boiling products of reaction, e. g. trimethylamine and dimethylamine, and a residue comprising hydrazine in aqueous solution. This residue may also be acidic, depending upon the nature of the material employed for supplying hydrogen to the aforementioned hydrogenation reaction (e. g., a hydrogen-supplying mixture comprising stannous chloride and hydrochloric acid). This residue is therefore first neutralized if in an acid condition, employing such compounds as sodium hydroxide, potassium hydroxide or sodium carbonate, and is then distilled. The distillate thus obtained comprises hydrazine as a product of the process, and may be further purified, if so desired.

The following examples will serve to illustrate but are not intended in any way to limit the process of the present invention.

*Example I*

Dinitrosopentamethylenetetramine was mixed with powdered zinc in approximately equal amounts by weight, at room temperature and at atmospheric pressure, with sufficient water to form a paste. This paste was then added slowly to a 50% aqueous solution of acetic acid. After approximately one-half of the paste had been added to the acetic acid, the solution assumed a white, colloidal appearance. The subsequent addition of hydrochloric acid caused the solution to turn yellow. This solution was then filtered, leaving a zinc residue. The filtrate was next analyzed spectrophotometrically and the presence of hydrazine was verified. Hydrazine was further identified by treating the filtrate with benzaldehyde to yield benzalazine.

*Example II*

A direct catalytic reduction of dinitrosopentamethylenetetramine with hydrogen in an Aminco pressure microbomb was effected. The reaction was carried out at a temperature between about 25° C. and about 50° C. and at atmospheric pressure, employing Raney nickel as a catalyst. Dinitrosopentamethylenetetramine in an amount of approximately 3 grams and the catalyst in an amount of approximately 0.3 gram were suspended in an aqueous solution containing 95% ethyl alcohol. The resulting product of hydrogenation was distilled and the residue analyzed spectrophotometrically and the presence of hydrazine was verified. Hydrazine was further identified by treating the residue with benzaldehyde to yield benzalazine.

*Example III*

The procedure of Example II was repeated in carrying out a direct catalytic reduction of dinitrosopentamethylenetetramine with hydrogen in an Aminco pressure microbomb, employing the aforementioned quantities of dinitrosopentamethylenetetramine and catalyst. The dinitrosopentamethylenetetramine and catalyst, suspended in 95% ethyl alcohol, were charged to the bomb. The bomb, however, was then pressured to 135 pounds per square inch with hydrogen at room temperature. The reaction was carried out for several hours at 50° C. with constant agitation. As in Example II, the presence of hydrazine in the residue obtained from distillation of the resulting product was identified by spectrophotometrical analysis and by the further treatment with benzaldehyde to yield benzalazine.

*Example IV*

The procedure of Example II was repeated employing powdered aluminum as the catalyst suspended in ammonium hydroxide. The reaction was carried out at atmospheric pressure and at a temperature between about 25° C. and about 30° C. As in Example II, the presence of hydrazine in the residue obtained from distillation of the resulting product was identified by spectrophotometrical analysis and by the further treatment with benzaldehyde to yield benzalazine.

*Example V*

The procedure of Example II was repeated employing powdered aluminum and mercury in approximately equal amounts suspended in 95% ethyl alcohol. The reaction was carried out at atmospheric pressure and at a temperature varying between about 25° C. and about 60° C. As in Example II, the presence of hydrazine in the residue obtained from distillation of the resulting product was identified by spectrophotometrical analysis and by further treatment with benzaldehyde to yield benzalazine.

I claim:

1. A process for the manufacture of hydrazine which comprises: suspending dinitrosopentamethylenetetramine and a hydrogenation catalyst in an inert liquid medium; and subjecting dinitrosopentamethylenetetramine thus suspended to hydrogenation with molecular hydrogen at a temperature within the range from substantially above atmospheric temperature to about 200° C. and at a pressure between about 100 and about 1000 pounds per square inch to produce hydrazine as a product of the process.

2. A process for the manufacture of hydrazine which comprises: suspending dinitrosopentamethylenetetramine and a hydrogenation catalyst in an inert liquid medium; and subjecting dinitrosopentamethylenetetramine thus suspended to hydrogenation with molecular hydrogen at a temperature within the range from substantially above atmospheric temperature to about 100° C. and at a pressure between about 100 and about 1000 pounds per square inch to produce hydrazine as a product of the process.

3. A process for the manufacture of hydrazine which comprises: suspending dinitrosopentamethylenetramine and a hydrogenation catalyst in an inert liquid medium; and subjecting dinitrosopentamethylenetetramine thus suspended to hydrogenation with molecular hydrogen at a temperature within the range from substantially above atmospheric temperature to about 200° C. and at a pressure between about 100 and about 500 pounds per square inch to produce hydrazine as a product of the process.

4. The process of claim 3 in which the catalyst comprises Raney nickel.

5. The process of claim 3 in which the catalyst comprises platinum.

6. The process of claim 3 in which the catalyst comprises palladium.

7. The process of claim 3 in which the catalyst comprises iron.

8. The process of claim 3 in which the catalyst comprises cobalt.

9. The process of claim 3 in which the inert liquid medium comprises methyl alcohol.

10. The process of claim 3 in which the inert liquid medium comprises ethyl alcohol.

11. The process of claim 3 in which the inert liquid medium comprises hexane.

12. The process of claim 3 in which the inert liquid medium comprises heptane.

13. The process of claim 3 in which the inert liquid medium comprises diethyl ether.

14. A process for the manufacture of hydrazine which comprises: suspending dinitrosopentamethylenetetramine and a hydrogenation catalyst in an inert liquid medium; and subjecting dinitrosopentamethylenetetramine thus suspended to hydrogenation with molecular hydrogen at a temperature within the range from substantially above atmospheric temperature to about 100° C. and at a pressure between about 100 and about 500 pounds per square inch to produce hydrazine as a product of the process.

15. A process for the manufacture of hydrazine which comprises: suspending dinitrosopentamethylenetetramine and a hydrogenation catalyst in an inert liquid medium; subjecting dinitrosopentamethylenetetramine thus suspended to hydrogenation with molecular hydrogen at a temperature within the range from substantially above atmospheric temperature to about 200° C. and at a pressure between about 100 and about 1000 pounds per square inch to obtain a hydrogenation product comprising hydrazine; and separating hydrazine from the hydrogenation product by distillation, as a product of the process.

References Cited in the file of this patent

UNITED STATES PATENTS 2,591,735   Solomon _____ Apr. 8, 1952

FOREIGN PATENTS 80,466   Germany _____ Mar. 13, 1895

OTHER REFERENCES

Curtius and Jay: Berichte der Deu Chem. 23, pp. 740–752 (1890).

Duden and Scharff: Annalen (Liebig's) 288, pp. 231–234 (1895).